(12) United States Patent
Landwehr

(10) Patent No.: US 10,017,424 B2
(45) Date of Patent: Jul. 10, 2018

(54) CERAMIC MATRIX COMPOSITES AND METHODS OF MAKING THE SAME

(71) Applicant: Rolls-Royce Corporation, Indianapolis, IN (US)

(72) Inventor: Sean Erin Landwehr, Avon, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 14/958,156

(22) Filed: Dec. 3, 2015

(65) Prior Publication Data

US 2016/0159698 A1 Jun. 9, 2016

Related U.S. Application Data

(60) Provisional application No. 62/087,513, filed on Dec. 4, 2014.

(51) Int. Cl.

| | |
|---|---|
| *C04B 35/80* | (2006.01) |
| *C04B 41/45* | (2006.01) |
| *C04B 35/64* | (2006.01) |
| *C04B 35/65* | (2006.01) |
| *C04B 35/634* | (2006.01) |
| *C04B 35/571* | (2006.01) |
| *C04B 35/573* | (2006.01) |

(Continued)

(52) U.S. Cl.
CPC ............ *C04B 35/65* (2013.01); *C04B 35/571* (2013.01); *C04B 35/573* (2013.01); *C04B 35/632* (2013.01); *C04B 35/634* (2013.01); *C04B 35/63408* (2013.01); *C04B 35/63448* (2013.01); *C04B 35/63476* (2013.01); *C04B 35/76* (2013.01); *C04B 35/806* (2013.01); *C04B 35/82* (2013.01); *C04B 2235/3826* (2013.01); *C04B 2235/428* (2013.01); *C04B 2235/48* (2013.01); *C04B 2235/483* (2013.01); *C04B 2235/5244* (2013.01); *C04B 2235/5248* (2013.01); *C04B 2235/602* (2013.01); *C04B 2235/614* (2013.01); *C04B 2235/616* (2013.01)

(58) Field of Classification Search
CPC .......................................... C04B 35/80–35/82
See application file for complete search history.

(56) References Cited

U.S. PATENT DOCUMENTS

| | | |
|---|---|---|
| 5,024,978 A | 6/1991 | Allaire et al. |
| 5,108,964 A | 4/1992 | Corbett et al. |

(Continued)

*Primary Examiner* — Erin Snelting
(74) *Attorney, Agent, or Firm* — Brinks Gilson & Lione

(57) ABSTRACT

An improved method of preparing ceramic matrix composites includes blending one or more ceramic powders with one or more paraffinic binders to form a slurry; introducing a ceramic fiber preform into a die or mold; heating the slurry to a temperature above the melting point of the one or more paraffinic binders to form a heated slurry; introducing the heated slurry into the die or mold, the heated slurry infiltrating the ceramic fiber preform to form a slurry infiltrated preform; cooling the die or mold below the solidification temperature of the paraffinic binder, thereby forming a solid component from the slurry infiltrated preform; removing the solid component from the die or mold; heating the solid component to a temperature whereby the paraffinic binder is removed; and densifying the solid component after removing the paraffinic binder, thereby forming the ceramic matrix composite.

17 Claims, 2 Drawing Sheets

(51) Int. Cl.
*C04B 35/632* (2006.01)
*C04B 35/76* (2006.01)
*C04B 35/82* (2006.01)

(56) References Cited

U.S. PATENT DOCUMENTS

| | | |
|---|---|---|
| 5,154,787 A | 10/1992 | Gardner et al. |
| 5,296,311 A | 3/1994 | McMurtry et al. |
| 5,436,042 A | 7/1995 | Lau et al. |
| 5,549,770 A * | 8/1996 | Larker ............... C04B 35/6455 156/89.27 |
| 5,840,221 A | 11/1998 | Lau et al. |
| 6,258,737 B1 | 7/2001 | Steibel et al. |
| 2013/0116109 A1* | 5/2013 | Ritti ..................... C04B 35/117 501/95.2 |

\* cited by examiner

CERAMIC MATRIX COMPOSITES AND METHODS OF MAKING THE SAME

RELATED APPLICATIONS

The present patent document claims the benefit of priority under 35 U.S.C. § 119(e) to U.S. Provisional Patent Application No. 62/087,513, filed on Dec. 4, 2014, and hereby incorporated by reference in its entirety.

TECHNICAL FIELD

The present disclosure relates to ceramic matrix composite preparation and more particularly, to a method of slurry infiltration of a ceramic fiber preform.

BACKGROUND

Currently there are two main processes by which ceramic matrix composites ("CMCs") and in particular, melt infiltrated SiC/SiC CMCs are made. One approach is described, for example, in U.S. Pat. Nos. 5,296,311 and 5,840,221, in which a silicon carbide preform is coated by a chemical vapor process, and then subsequently infiltrated with a slurry in a manner similar to slip casting and then allowed to dry. The powder infiltrated preform is then infiltrated with molten Si metal.

A second approach is described in U.S. Pat. No. 6,258,737, in which a melt infiltrated SiC/SiC CMC is made by a pre-preg process in which fiber tows are impregnated with a powder filled binder (also containing preceramic polymers and high carbon char yielding materials) and then formed into shape after the impregnation.

Other powder injection molding methods used in ceramic processing involve heating a binder filled powder to a molten or near molten state and injecting it, under pressure, into a mold or die. This method is usually employed for high throughput operations for making small, complicated parts. This method is typically avoided for manufacturing large components.

Current slurry infiltration methods for preparing CMCs have relatively long cycle times, and provide relatively poor particulate uniformity, poor dimensional control of near-net-shape components, and undesirably rough surfaces. Accordingly, there remains a need for further improvements in these areas. The processes for preparing CMCs described herein may provide reduced cycle times, improved particulate uniformity, increased dimensional control of near-net-shape components, and reduced surface roughness compared to conventional slurry methods. In addition, the methods of the present disclosure may provide increased metal conversion when employed with a melt infiltration process.

BRIEF SUMMARY

Described herein is an improved method of preparing ceramic matrix composites. The method includes blending one or more ceramic powders with one or more paraffinic binders to form a slurry; introducing a ceramic fiber preform into a die or mold; heating the slurry to a temperature above the melting point of the one or more paraffinic binders to form a heated slurry; introducing the heated slurry into the die or mold, the heated slurry infiltrating the ceramic fiber preform to form a slurry infiltrated preform; cooling the die or mold below the solidification temperature of the paraffinic binder, thereby forming a solid component from the slurry infiltrated preform; removing the solid component from the die or mold; heating the solid component to a temperature whereby the paraffinic binder is removed; and densifying the solid component after removing the paraffinic binder, thereby forming the ceramic matrix composite.

DETAILED DESCRIPTION

Figure 1:
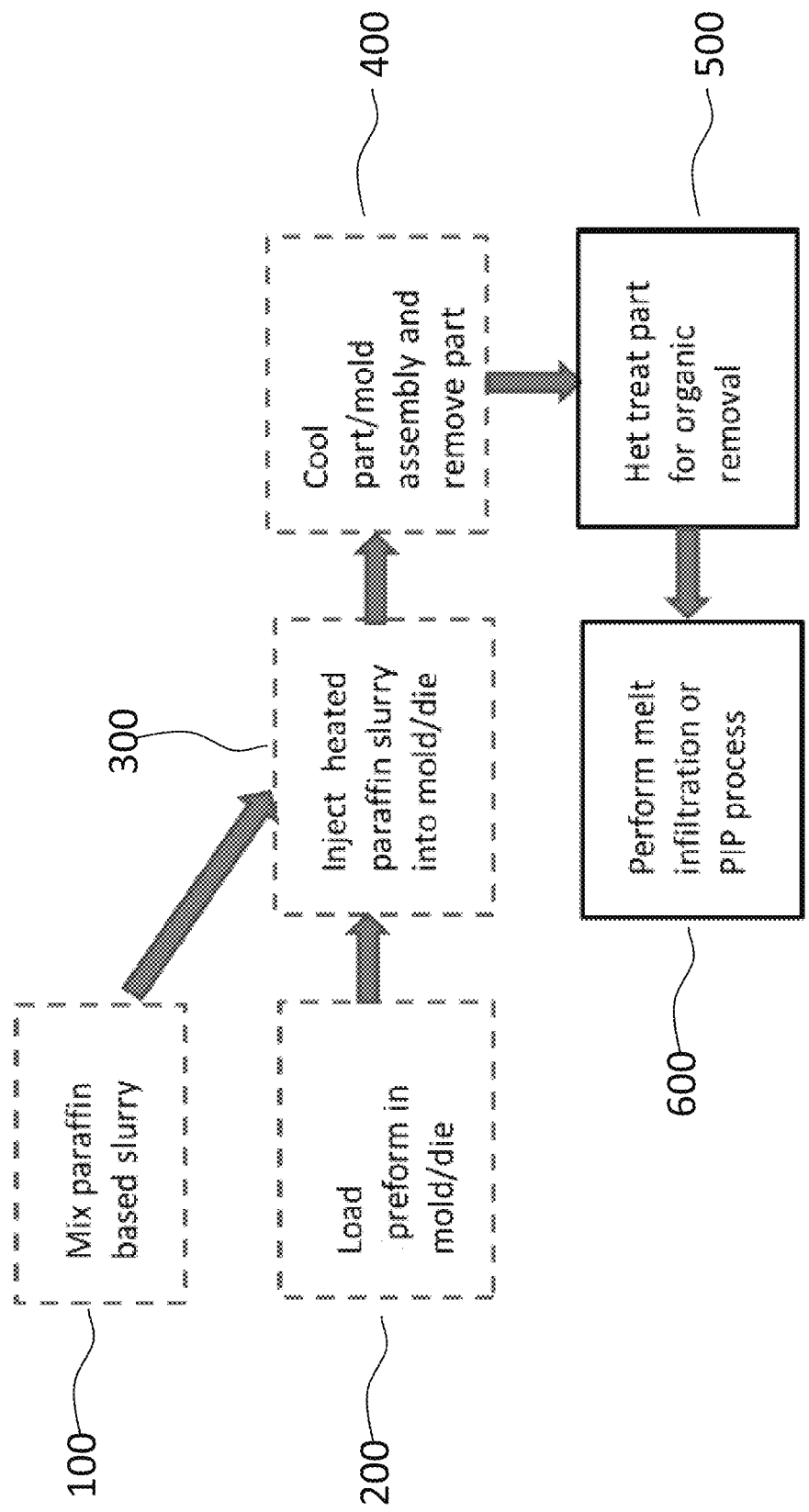
FIG. 1 is a flow chart illustrating a method for the preparation of a ceramic matrix composite component according to an embodiment of the present invention.

Many components utilized within a gas turbine engine may comprise a ceramic matrix composite ("CMC"), as CMCs are suitable for operational use in the high pressure and high temperature internal operating environment of a gas turbine engine. CMCs are described generally and conventional CMC manufacturing processes are well known to those of ordinary skill in the art.

CMCs are generally made from a lay-up of a plurality of continuous ceramic fibers, formed to a desired shape. At this stage in the production of a CMC component, the lay-up is generally known as a ceramic fiber preform, fiber preform, or preform. The fiber preform can be can be partially-rigidized or non-rigidized and can be constructed in any number of different configurations. For example, the preform may be made of filament windings, braiding, and/or knotting of fibers, and may include two-dimensional and three-dimensional fabrics, unidirectional fabrics, and/or nonwoven textiles. The fibers used in the preform, furthermore, can comprise any number of different materials capable of withstanding the high processing temperatures used in preparing and operating CMCs, such as, but not limited to, carbon fibers, ceramic fibers (e.g., silicon carbide, alumina, mullite, zirconia, or silicon nitride), which can be crystalline or amorphous. The ceramic fibers may be suitably coated by various methods.

During preparation of the CMC, the preform can be infiltrated with a matrix precursor material. The matrix precursor material can comprise any number of materials such as, but not limited to, polymers, metals, and ceramics, such as silicon carbide, alumina, mullite, zirconia, and silicon/silicon carbide. In most embodiments, the matrix precursor material comprises ceramic particles. The preform can be infiltrated with the matrix precursor material using any number of processes, for example by infiltration of the preform with a slurry of the matrix precursor material under elevated or reduced pressure, by chemical vapor deposition or chemical vapor infiltration, by pyrolysis (e.g., of a preceramic polymer), by chemical reactions, sintering, melt infiltration, and electrophoretic deposition (e.g., of a ceramic powder).

Finally, the part may be machined, if necessary to bring the part geometry into the required specifications.

The present disclosure relates to the preparation of a ceramic matrix composite and more particularly, to a method which may provide several benefits, such as increased particulate uniformity, increased dimensional control of the near-net-shape component, reduced surface roughness and reduced cycle time compared to slurry infiltration processes currently known in the art.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

FIG. 1 is a flow chart illustrating an exemplary method for the preparation of a ceramic matrix composite component. The exemplary method starts at step 100, in which a slurry comprising a paraffinic binder (e.g., a paraffin wax or mineral oil) is prepared. In this step, one or more ceramic powders are blended with one or more paraffinic binders to form a slurry.

The one or more ceramic powders can be any ceramic powders useful as a matrix precursor material as described herein. In one embodiment, the ceramic powders are selected from one or more of the group consisting of silicon carbide (SiC) and silicon/silicon carbide. In another embodiment, the paraffinic binders are selected from one or more of the group consisting of paraffin waxes, and heavy mineral oils. In another embodiment, the one or more ceramic powders are blended with the one or more paraffinic binders to form a homogenous mixture. The one or more ceramic powders can comprise about 20-70 vol. % of the slurry, inclusive of at least about 20 vol. %, at least about 30 vol. %, at least about 40 vol. %, at least about 50 vol. %, and up to about 60 vol. %, or up to about 70 vol %, including any ranges or subranges thereof. The paraffinic binder (e.g. paraffin wax or heavy mineral oil) can comprise the remaining about 30-80 vol. % of the slurry, inclusive of at least about 30 vol. %, at least about 40 vol. %, at least about 50 vol. %, at least about 60 vol. %, and up to about 70 vol. %, or up to about 80 vol. %, including any ranges or subranges thereof.

Figure 2:
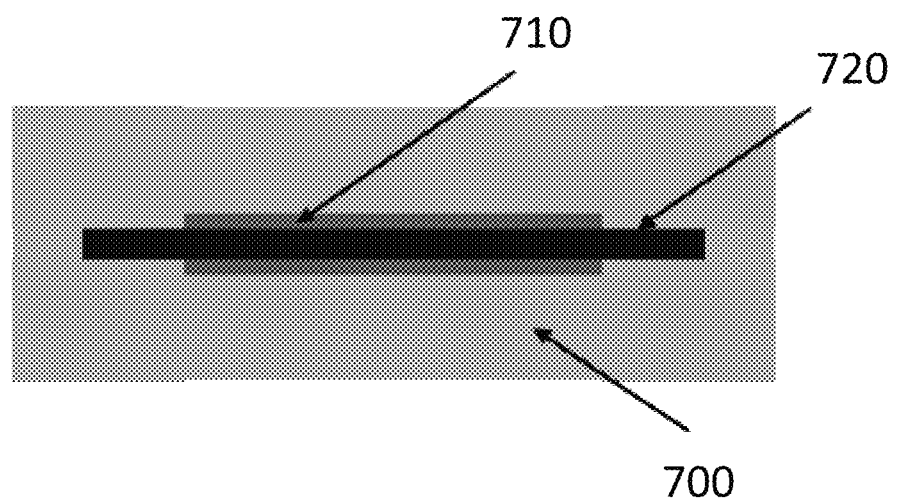
FIG. 2 is a view of a mold or die configuration that allows for extra volume to allow for machining stock in the finished part.

At step 200 of FIG. 1, a preform as described herein is loaded or inserted in a mold or die. The preform may comprise, for example, a coated fiber or fabric, and the preform can, in some embodiments, be prepared by or subjected to chemical vapor infiltration (CVI) prior to insertion into the die or mold. In such instances, the preform is rigid enough to be simply placed into the die/mold. Alternatively, the coated fiber/fabric preform is laid up in the die or mold and readied for the introduction of the slurry. If desired, contact points between the preform and the die can be provided such that the part can be provided with extra volume to provide machining stock after the part is finished, as shown in FIG. 2.

At step 300 of FIG. 1, the slurry is heated up above the melting point of the paraffinic binder system so that the slurry is flowable and the heated slurry is injected into the mold or die for infiltration of the coated fiber or fabric preform. In some embodiments, the mold or die may be heated to facilitate the infiltration of the preform. Also or alternatively, pressure can be applied to assist in filling the preform in the mold or die. In some embodiments, vacuum may be applied to the mold or die to assist infiltration of the preform. Various combinations of heating, application of pressure, and vacuum can be applied to assist infiltration.

At step 400 of FIG. 1, the resulting component prepared by slurry infiltration of the preform as described herein is removed from the die or mold. Specifically, after infiltration of the coated fiber or fabric preform, the temperature is lowered to below the solidification temperature of the paraffinic binder so that the component solidifies and may then be conveniently removed from the die or mold. After removal, the surface of the solidified component can be free of the texture of the preform fibers or the weave of the preform fibers.

At step 500 of FIG. 1, the solidified component may then be heat treated to remove any paraffinic binder. In one embodiment, the component is heat treated at a temperature of at least about 600° C. (e.g., in the range of 600° C. to about 700° C.) under vacuum or under an inert atmosphere. The heating step ensures removal or conversion to inorganic species of essentially all of the paraffinic binder from the solid component. In some embodiments, when the binder includes particular resins, such as a phenolic resin, the heating step may result in the formation of a carbon residue.

Step 600 of FIG. 1 describes additional process steps which convert the heat treated component of step 500 into a fully solidified CMC component. For example, the heat treated component can be melt infiltrated, or a polymer impregnation and pyrolysis process may be performed. Advantageously, this step may substantially eliminate the remaining porosity by the infiltration of a molten phase (in the case of SiC/SiC composites, this is usually silicon) or with the infiltration of a preceramic polymer that is then pyrolyzed to form a ceramic material (in the case of SiC/SiC composites, this is usually a polycarbosilane).

FIG. 2 depicts a mold or die configuration 700 that allows for extra fill volume 710 beyond the coated fiber or fabric preform 720 that is to be injected with the heated mixed slurry. As discussed herein, the extra volume allows for the creation of machining stock after the assembly component is developed.

Beyond the exemplary methods described in the figures, the present disclosure may also include the following ceramic matrix composite components and methods. In a specific embodiment, the methods for the preparation of a ceramic matrix composite component may comprise the following steps, not necessarily in the order shown:

a) blending one or more ceramic powders with one or more paraffinic binders;

b) disposing a ceramic fiber preform, which may be a coated fiber or fabric preform, in a die or mold;

c) heating the mixture of ceramic powder and paraffinic binders to above the melting point of the paraffinic binder to form a heated slurry;

d) introducing the heated slurry into the die or mold containing the preform;

e) cooling the die or mold to a temperature below the solidification temperature of the paraffinic binder(s) to form a solid assembly;

f) removing the solid assembly from the die or mold;

g) heating the solid assembly to a temperature sufficient to remove the paraffinic binder(s); and h) densifying the assembly component after step (g) with a process selected from: (i) melt infiltration of the assembly component or (ii) polymer impregnation and pyrolysis to provide a CMC.

In one embodiment of the invention, the one or more ceramic powders with one or more paraffinic binders in step a) may be blended to a homogenous mixture. In another specific embodiment, the ceramic powder and paraffinic binder can be blended in a mixer with a high enough combination of shear rate and temperature to intimately combine the paraffinic binder and the powders to form a homogenous mixture.

In another embodiment, the ceramic powder and organic binder may be mixed in various ratios. In one embodiment, the mixture of ceramic powder and organic binder may include ceramic powder in an amount of about 20% to about 70% by volume. In another embodiment, the mixture of ceramic powder and organic binder may include organic binder in an amount of about 30% to about 80% by volume. In still other embodiments, the ceramic powder may be present in an amount of at least about 20 vol. %, at least about 30 vol. %, at least about 40 vol. %, at least about 50 vol. %, and up to about 60 vol. %, or up to about 70 vol. %, or up to about 80 vol. %, inclusive of all ranges and subranges therebetween.

In another embodiment, the ceramic powders may be selected from one or more of the group consisting of silicon carbide (SiC) and silicon/silicon carbide. In a specific embodiment, the silicon carbide may be that sold under the trade name Nicalon™ and manufactured by the Nippon Carbon Co., Ltd. of Tokyo, Japan.

In another embodiment the SiC in the ceramic powder may be of different particle sizes. In another embodiment, the SiC in the ceramic powder may range in particle size from about 0.25 to about 30 micrometers, including at least about 0.25, at least about 0.30, at least about 0.40, at least about 0.50, at least about 1, at least about 2, at least about 3, at least about 4, at least about 5, at least about 10, and no more than about 15, or no more than about 20, or no more than about 25, or no more than about 30 micrometers, inclusive of all ranges and subranges therebetween. The SiC in the ceramic powder may have different particle sizes and particle size distributions suitable for various purposes. For example, the ceramic powder could comprise SiC power of different particle sizes to form a unimodal or multi-modal particle size distribution or could include other minor constituents to modify matrix behavior.

In another embodiment, the one or more paraffinic binders may be selected from the group consisting of paraffin wax, and mineral oil. In one embodiment, the mineral oil may be heavy mineral oil such as paraffinic oils. In another specific embodiment, the paraffinic binder may be mixed with other components to make a paraffinic binder mixture.

In one embodiment, the paraffinic binder mixture may include one or more surfactants. In a specific embodiment, the surfactant may be added to facilitate the incorporation of the ceramic powder into the paraffinic binder(s). In another specific embodiment, the surfactants may include one or more fatty acids. In one embodiment, the one or more fatty acids may be saturated or unsaturated, branched or linear. In another embodiment, the one or more fatty acids may have in the range of 16 to 20 carbon atoms. In another specific embodiment, the one or more fatty acids may include oleic acid, stearic acid, arachidic acid, palmitic acid, palmitoleic acid, sapienic acid, elaidic acid, vaccenic acid, linoleic acid and linolaidic acid. In another embodiment, the surfactant may be included in the paraffinic binder mixture at from about 1% to about 12% total weight of the paraffinic binder mixture.

In another embodiment, the paraffinic binder mixture may include one or more high molecular weight polymers. High molecular weight polymers may be included in the paraffinic binder mixture to increase the effective melting point of the paraffinic binder. In a specific embodiment, the one or more high molecular weight polymers may be selected from the group consisting of polyethylene, microcrystalline wax and phenolic resin. In another embodiment, the high molecular weight polymer may be included in the paraffinic binder mixture at from about 5% to about 75% total weight of the paraffinic binder mixture.

In another embodiment, the preform may be prepared from any of a number of materials such as, but not limited to, ceramic fibers, carbon fibers, organic fibers, metallic fibers, and glass fibers. In a specific embodiment, the preform may be made from ceramic fibers. In another embodiment, the fiber preform can be can be partially-rigidized or un-rigidized. The fiber preform can be constructed in any number of different configurations. For example, the preform may be made of filament windings, braiding, and/or knotting of fibers, or from one or more fabrics, including two-dimensional and three-dimensional fabrics, unidirectional fabrics, and/or nonwoven textiles.

In a specific embodiment, the preform may be made from ceramic fibers and in the form of a fabric. In another specific embodiment, the ceramic fibers are in the form of a fabric and are coated. In other embodiment, the coating is a functional low modulus interphase coating. After coating, the preform may then be loaded or inserted in the mold or die. The coated prefab fibers may then be laid up in the die or mold and readied for the injection of the mixed slurry of ceramic powder and organic binder mixture discussed above.

In one specific embodiment, the preform is rigidized by chemical vapor infiltration (CVI) or another method known in the art prior to laying the coated fiber or fabric preform in the die or mold. In this case, the preform component may be rigid enough to simply place in the die or mold.

In one specific embodiment, the die or mold may be modified depending on the specific preform component. The die or mold performs the important function of controlling the tolerances of the preform component. Accordingly, contact points may be made in such as way to give extra volume beyond the preform component. In a specific embodiment, the mold or die allows for extra fill volume beyond the coated fiber or fabric preform component that is to be injected with the heated mixed slurry. The extra volume allows for the creation of machining stock after the assembly component is developed.

In another embodiment, the present invention includes ceramic matrix composite components prepared by the processes discussed herein.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and embodiment lacking the same may be contemplated as within the scope of the invention, that scope being defined by the claims that follow. In reading the claims it is intended that the words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary. All documents cited herein are hereby incorporated by reference in their entirety for all purposes.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method for preparing a ceramic matrix composite, the method comprising:
   blending one or more ceramic powders with one or more paraffinic binders and phenolic resin to form a slurry;
   introducing a ceramic fiber preform into a die or mold;
   heating the slurry to a temperature above the melting point of the one or more paraffinic binders to form a heated slurry;
   introducing the heated slurry into the die or mold, the heated slurry infiltrating the ceramic fiber preform to form a slurry infiltrated preform;
   cooling the die or mold below the solidification temperature of the paraffinic binder, thereby forming a solid component from the slurry infiltrated preform;
   removing the solid component from the die or mold;
   heating the solid component to a temperature whereby the paraffinic binder is removed; and
   densifying the solid component after removing the paraffinic binder, thereby forming the ceramic matrix composite,
   wherein, prior to introducing the ceramic fiber preform into the die or mold, the ceramic fiber preform is rigidized.

2. The method of claim 1, wherein the densifying is by melt infiltration.

3. The method of claim 1, wherein the densifying is by polymer impregnation and pyrolysis.

4. The method of claim 1, wherein the slurry comprises from about 20% to about 70% by volume of the one or more ceramic powders.

5. The method of claim 4, wherein the slurry comprises from about 30% to about 80% by volume of the one or more paraffinic binders.

6. The method of claim 1, wherein the slurry comprises from about 30% to about 80% by volume of the one or more paraffinic binders.

7. The method of claim 6, wherein the one or more paraffinic binders are mixed with a surfactant and the phenolic resin to form a paraffinic binder mixture.

8. The method of claim 7, wherein the surfactant comprises one or more saturated or unsaturated C12-C16 fatty acids.

9. The method of claim 8, wherein the surfactant has a concentration in the paraffinic binder mixture of from about 1% to about 12% by weight.

10. The method of claim 7, wherein the phenolic resin has a concentration in the paraffinic binder mixture of from about 5% to about 75% by weight.

11. The method of claim 1, wherein the one or more ceramic powders are selected from the group consisting of silicon carbide (SiC), silicon/silicon carbide, and combinations thereof.

12. The method of claim 1, wherein the one or more paraffinic binders are selected from the group consisting of paraffin wax, heavy mineral oil, and combinations thereof.

13. The method of claim 1, wherein the ceramic fiber preform is in the form of a fabric with an interphase coating on fibers of the ceramic fiber preform.

14. The method of claim 1, wherein the ceramic fiber preform is rigidized by chemical vapor infiltration (CVI).

15. The method of claim 1, wherein the mold or die is configured for extra fill volume in excess of the volume of the ceramic fiber preform.

16. The method of claim 1, wherein the heating to remove the paraffinic binder is to a temperature of at least about 600° C.

17. The method of claim 1, wherein the phenolic resin is present at a concentration from about 5% to about 75% a total weight of the one or more paraffinic binders and the phenolic resin.

* * * * *